US012690564B2

(12) United States Patent
Steele, Jr.

(10) Patent No.: US 12,690,564 B2
(45) Date of Patent: Jul. 28, 2026

(54) WEARABLE BI-DIRECTIONAL WATER DISPENSING DEVICE FOR A PET

(71) Applicant: Scott Joel Steele, Jr., Jacksonville, FL (US)

(72) Inventor: Scott Joel Steele, Jr., Jacksonville, FL (US)

( * ) Notice: Subject to any disclaimer, the term of this patent is extended or adjusted under 35 U.S.C. 154(b) by 0 days.

(21) Appl. No.: 18/351,656

(22) Filed: Jul. 13, 2023

(65) Prior Publication Data

US 2025/0017172 A1     Jan. 16, 2025

(51) Int. Cl.
*A01K 7/00* (2006.01)
*A01K 27/00* (2006.01)
*B05B 11/10* (2023.01)

(52) U.S. Cl.
CPC .............. *A01K 7/00* (2013.01); *A01K 27/002* (2013.01); *A01K 27/008* (2013.01); *B05B 11/1028* (2023.01)

(58) Field of Classification Search
CPC ...... A01K 7/00; A01K 27/002; A01K 27/008; A45F 2003/166
USPC ........................................................ 222/175
See application file for complete search history.

(56) References Cited

U.S. PATENT DOCUMENTS

| | | | |
|---|---|---|---|
| 2008/0067202 A1* | 3/2008 | Silva ...................... | A41D 13/01 |
| | | | 362/108 |
| 2010/0307715 A1* | 12/2010 | Emenheiser .............. | A45F 3/16 |
| | | | 165/47 |
| 2011/0027758 A1* | 2/2011 | Ochs .................... | A61C 17/028 |
| | | | 433/215 |
| 2016/0175866 A1* | 6/2016 | Kalalau .................... | A45F 3/16 |
| | | | 222/394 |
| 2019/0216052 A1* | 7/2019 | Yang ........................ | A01K 7/00 |
| 2020/0122187 A1* | 4/2020 | DiStefano .............. | B60R 15/02 |
| 2020/0375147 A1* | 12/2020 | Ohanian .............. | A01K 27/002 |

* cited by examiner

*Primary Examiner* — Joshua J Michener
*Assistant Examiner* — Spencer T Callaway
(74) *Attorney, Agent, or Firm* — Ruggiero McAllister & McMahon LLC

(57) ABSTRACT

An article that is wearable by a pet that is fitted to the pet in a secure manner including a bladder bag that is adapted to hold a fluid (e.g., water) and including a series of flexible tubing extending from the bladder bag through a series of valves and a pump and to a fluid dispensing receptacle connected to the flexible tubing. Selectively setting the valves to a first position allows for fluid to be pumped from the bladder bag to the fluid dispensing receptacle, and setting the valve to a second position allows for any remaining fluid to be pumped from the fluid dispensing receptable back to the bladder bag.

18 Claims, 9 Drawing Sheets

WEARABLE BI-DIRECTIONAL WATER DISPENSING DEVICE FOR A PET

BACKGROUND

1. Field of the Invention

The present disclosure is related to a wearable water (or liquid) bladder system that allows an animal to carry their own water source on their body while being able to drink through a tube system via an affixed water containment receptacle at the end distal end of the tubing.

2. Description of Related Art

The water content of an animals' body (such as a dog) is extremely important and must be maintained at an appropriate level to be comfortable and avoid the dangers of dehydration. The rate at which fluids are aspirated from an animals' body into the atmosphere increases with physical exertion and ambient temperature. Under more extreme circumstances, such as when the temperature is high, the sun is intense, and the animal is strenuously exerting themselves, the rate at which perspiration leaves the body is alarmingly rapid. In such circumstances, it is important for the animal to ingest rehydrating liquids almost at the same rate as the loss from the body to prevent deterioration of the mental and physical performance of the animal.

Animal companions of athletes such as runners, hikers, hunters, as well as military and police personnel, are examples of animals who require a constant replenishment of water or other hydrating liquids while performing. Also, examples such as those listed above are often not near a constant water supply, so water conservation (e.g., avoiding waste) is often just as important as water planning (e.g., packing water for the activity).

Unfortunately for animal owners, pets cannot tell us how much water they want us to fill their bowl with. So unfortunately, unused water is often discarded and thus wasted. Additionally, for any performance animal and their owner, carrying only the total amount of water that is necessary for the planned activity is critical considering the weight of water. Additionally, requiring different accessories that need to be packed and unpacked for each use on a hike or a mission can present serious issues when performance and timing is critical.

Various products have sought to address the above-listed problems with limited success. For example, currently there are several vests and water bottles that are provided for animals, however, these all fail to address the performance issues and efficiency of use needed for certain applications.

One type of system is the provision of a water bottle with an affixed bowl. A major problem with this type of system is that it requires the person accompanying the animal to carry the bottle/bowl. For athletes or military personnel, this can be unacceptable. For athletes, adding any type of burden can be unacceptable. For military personnel, the added weight can displace space needed for equipment or other items. Another problem with this type of system is that, to access the water, the person must stop, get the equipment out of a pack, pour the water into the bowl, and if any water is left, try to pour the water back into the narrow top of the water bottle. This can be very difficult if on uneven ground (e.g., on a mountainside or difficult terrain) or the time involved in the process may be unacceptable.

Another problem with water bottles is the space they take up in a pack. These types of water bottles with a bowl are rigid and have a solid boundary, which means they can take up critical space in a pack. Still another problem with water bottles is that they don't carry a very large amount of water. This means that multiple water bottles may need to be carried, taking up even more space that could be used for other things. Still further, even when the water is used up, the empty water bottle still takes up the same amount of space.

Another type of system is a vest that is worn by the animal that contains a water bladder and a removable bowl. While this type of system is superior to the bottle and attach bowl system, there are still problems with the current systems that need to be addressed. For example, current systems have a bowl that needs to be stored in a pack, whether carried by the animal or the person accompanying the animal. As such, while it is an improvement for the animal to carry it's own water and bowl, there still is an unacceptable amount of time that is required to stop, open the pack, unpack the bowl, pour the water into the bowl and then repack the bowl when finished. Additionally, any unused portion of water for these types of systems must be discarded as it is not feasible to take the vest off the animal and try to somehow get the water back into the bladder system. Additionally, since the bladder is not rigid, it would probably require two people to try to put the water back into the bladder after it was removed from the animal. Still further, success of saving all the water is very unlikely because pouring a liquid from a wide mouth opening such as a bowl to a small opening on a spout for a bladder is very difficult.

Another problem with current vest designs is that they are not form-fitting or snug to the animal's body. This results in a very loose carry. The problem with this is that if the vest does not ride close and snug to the body, it will move and slap against the animal when the animal is running causing the animal to exert more energy than they should and thereby lowering the performance of the animal to keep up with the person.

One system disclosed in WO/1997003586A2 ("the '586 patent") entitled "Reusable Drinking Device" discloses a "portable and reusable drinking device that a user can carry passively on his or her person" where the person "actuates the pump (115) to pressurize the bag (101) via a drinking tube (111) that extends inside the lining of the garment." Abstract. "The pump (115) may then be used as often as required to maintain a constant pressure in the flexible bag (101)." Abstract. The '586 patent teaches that a pump and tube system can be used to pump fluid from a zipped pocket 313 to a reservoir 315 and that the pump 301 is used to pump the fluid (e.g., the contents of a can such as soda) emptied into the zipped pocket 313 to the reservoir 315 where it can be pressurized and the user can drink through a straw directly from the reservoir 315. However, the '586 patent fails to teach that fluid can be moved in two directions from a fluid holding device (e.g., a bag) to a receptacle to drink from and then any unused portion can be returned to the fluid holding device.

Another system is disclosed in U.S. Patent Application Publ. No. 2022/0026000A1 (the '000 application") entitled "Hydration System and Components Thereof". The '000 application provides a backpack that can be carried on a person's back and comprises a flexible reservoir (bladder bag) with a pump and drinking tubes. However, like the '586 patent, the '000 application fails to disclose any way to reverse the flow of the fluid to return any unused portion to the reservoir. When viewed for what they are it makes sense as both the '586 patent and the '000 application provide drinking straws for a person to drink from. A person is only going to drink as much as they want and there will be no unused portion in a drinking receptacle. Neither of these is designed to be used by an animal.

Accordingly, there is a need for a water carrying device or system for an animal that will overcome, alleviate, and/or mitigate one or more of the aforementioned and other deleterious effects of prior art.

SUMMARY

Accordingly, what is needed is a system and method for enabling an animal to carry their own water where the system is easily and practically able to deliver water to the animal without wasting any of the water that is dispensed but not consumed by the animal.

It is also desired to provide a system and method that easily allows an animal to drink water from a device worn by the animal and facilitates for a bowl to be accessed and stowed away very quickly.

It is further desired to provide a wearable water bladder system that utilizes a series of pumps and/or valves to move the water through the line.

It is still further desired to provide a wearable water bladder system that facilitates bi-directional movement of water through a series of pumps and/or valves and a water line.

Finally, it is desired to provide a bladder bag system and vest does not need to be removed to allow the animal to drink the water transferred from the wearable water to a collapsible bowl that remains attached to the animal as one unit.

These and other objects are achieved in one configuration where a vest system is conveniently supported in an attached relationship to the animal's torso. In one configuration, the collapsible bladder bag sits on the upper two sides of the animal's torso (just outward of and on the side of the animal's spine). In another configuration, the bladder sits affixed between the animal's shoulder blades sitting on the animal's spine. A flexible tube may extend from the collapsible bladder bag to a series of valves and/or pumps connecting to a water containment receptacle. Water can then be dispensed to a collapsible bowl with ease for the animal to drink. If the animal does not consume all the water that is dispensed into the water containment receptacle, the water can then be pumped back from the water containment receptacle through the series of pumps and/or valves to be reintroduced back into the collapsible bladder bag for future use.

In another configuration, an adjustable vest comprises a flexible, tight-fitting material (e.g., neoprene or other similar material) that includes a sealable pocket that is situated on one side of the animal's spine on the upper torso. Inside the pocket a removable collapsible bladder bag is provided that is connected to a plastic, flexible tubing that acts as a water conduit where a proximal end of the flexible tubing is connected to the bladder bag, and distal end of the tubing is where the water is dispensed. The tubing will extend through a relatively small hole on the side of the pocket that allows the flexible tubing to exit the pocket of the vest while allowing the vest to remain closed.

The flexible tubing system is designed by connecting the proximal end of a flexible tubing to the bladder bag such that water in the bladder bag can enter the proximal end of the flexible tubing. The flexible tubing extends to a check valve that is positioned within a movable 180-degree one-way ball valve, and then to a bulb hand pump connecting to another check valve positioned in another movable 180-degree one-way ball valve, which continues to the distal end that empties into a collapsible silicone water bowl.

The direction of water flow is selectable via the two valve switches. The setting of the two valve switches determines the direction of water flow from the bladder bag to the collapsible silicon water bowl or from the collapsible silicon water bowl to the bladder bag. Water will flow in one of the two directions, based on the position of the two valve switches, when the bulb pump is actuated.

When the bulb pump is compressed, positive displacement and will pump water through a one-way check valve that allows water to only flow in a single direction that is chosen by the owner by switching the two valves on the two check valves. The water will remain in the collapsible bowl through the pressure of the water that remains in the line and will only flow back to the bladder bag if the valve switches are positioned so allow for flow in the opposite direction toward the bladder bag.

For this application the following terms and definitions shall apply:

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, components, systems, subsystems, and/or means, constituting any one or more of (a) a connection, whether direct or through one or more other devices, apparatus, components, systems, subsystems, or means, (b) a communications relationship, whether direct or through one or more other devices, apparatus, components, systems, subsystems, or means, and/or (c) a functional relationship in which the operation of any one or more devices, apparatus, components, systems, subsystems, or means depends, in whole or in part, on the operation of any one or more others thereof.

In one configuration a fluid pumping system adapted to be worn by an animal via a harness is provided, the system comprising: a bladder bag supported by the harness and adapted to be filled with a fluid, and a valving system supported by the harness and including: a first one-way valve, a pump, and a second one-way valve. The system further comprises a first flexible tubing connected at one end to the bladder bag and at another end to a first end of the valving system, a fluid dispensing receptacle, and a second flexible tubing connected at one end to a second end of the valving system and at another end to the fluid dispensing receptacle. The system is provided such that when the pump is actuated, fluid flows from the bladder bag through the valving system and to the fluid dispensing receptacle.

In another configuration a method of transferring a fluid in a fluid transfer system maintained in a harness supporting a bladder bag filled with the fluid is provided comprising the steps of: detaching a fluid dispensing receptacle from the harness, the fluid dispensing receptacle connected to a valving system via a second flexible tubing, switching a first one-way valve associated with the valving system to a first position, and switching a second one-way valve associated with the valving system to a first position. The method further comprises the steps of: actuating a pump to cause fluid to transfer from the bladder bag through a first flexible tubing and through the first and second one-way valves via and into the fluid dispensing receptacle, switching the first one-way valve to a second position, switching the second one-way valve to a second position, and actuating the pump to cause fluid to transfer from the fluid dispensing receptacle into the bladder bag.

In still another configuration a method of transferring a fluid in a fluid transfer system maintained in a harness supporting a bladder bag filled with the fluid comprising the steps of: detaching a fluid dispensing receptacle from the harness, the fluid dispensing receptacle connected to a valving system via a second flexible tubing, and actuating a first section of a pump to cause fluid to transfer from the bladder bag through a first flexible tubing, through a first and second one-way valve, through the second flexible tubing, and into the fluid dispensing receptacle. The method further comprises the step of actuating a second section of the pump to cause fluid to transfer from the fluid dispensing receptacle through a fourth flexible tubing, through a third and fourth one-way valve, through a third flexible tubing, and into the bladder bag.

The above-described and other features and advantages of the present disclosure will be appreciated and understood by those skilled in the art from the following detailed description, drawings, and appended claims.

DETAILED DESCRIPTION

Figure 1:
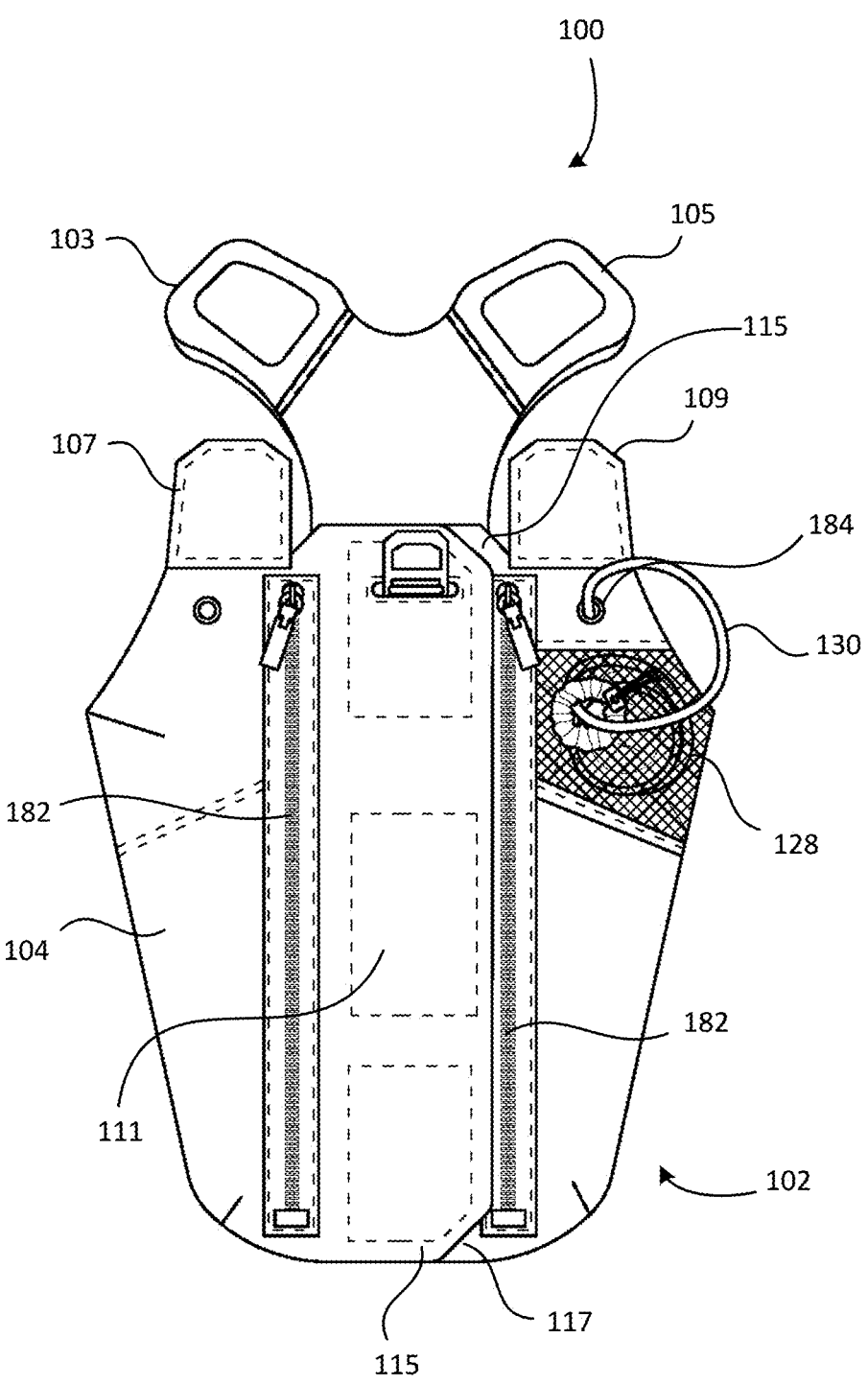
FIG. 1 is an illustration of one configuration of the current invention showing a harness in the form of a vest to hold the fluid pumping system.

Referring now to the drawings, wherein like reference numerals designate corresponding structure throughout the views. FIG. 1 depicts a top view of one configuration of the invention where the fluid pumping system 100 is positioned in a harness, which in this configuration comprises a vest 102 that can be worn by an animal (e.g., a dog).

Figure 2:
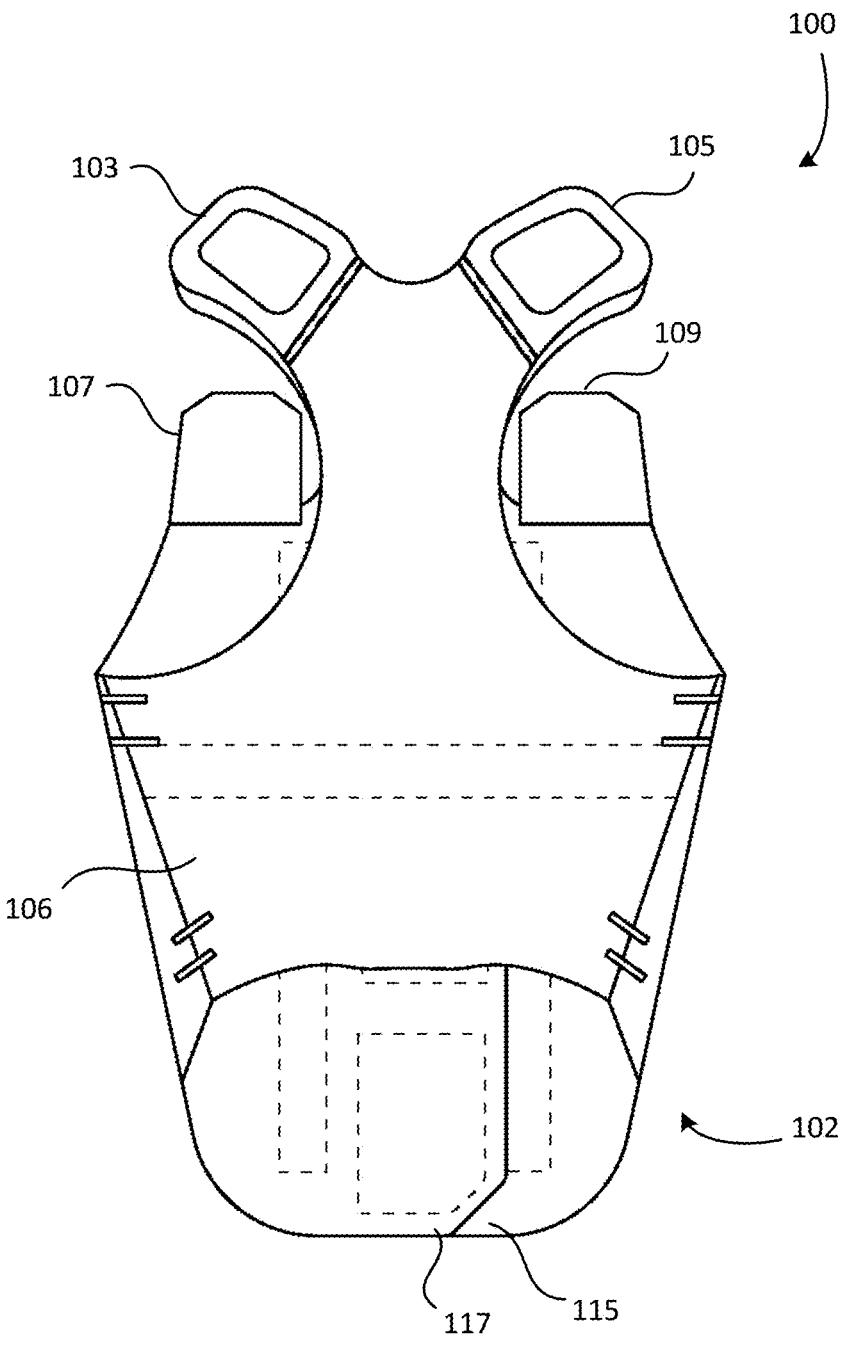
FIG. 2 is an illustration of the vest according to FIG. 1.

With reference to FIGS. 1 and 2, vest 102 may comprise an upper portion 104 that would generally sit on top of the animal's back and around its sides, and a lower portion 106 that would extend under the animal's belly. The vest securing mechanism may comprise multiple detachable connections that may comprise, for example, hook and loop fasteners. In the embodiment shown in FIGS. 1 and 2, the hook fasteners 103, 105 shown in FIGS. 1 and 2 are connectable with the loop fasteners 107, 109. In the configuration illustrated, the hook fasteners 103, 105 extend around both sides of the loop fasteners 107, 109 effectively sandwiching them to provide a secure connection that can be snug and tight to the animal's body.

Additionally, vest 102 may be provided with hook and loop fasteners running along a center portion 111 of the vest on the top of the animal's back. For example, an overlapping section 115 is provided to extend over and lay flat against an upper section 117. This will allow for adjustment of vest 102 to fit snug against the animal's body.

The system 100 includes a collapsible container(s) of water or other liquid stored within a flexible vest/harness 102 that is removably secured between the shoulders and/or the upper torso of the animal fitting snug as to not slap the animal while the animal walks or runs.

Figure 6:
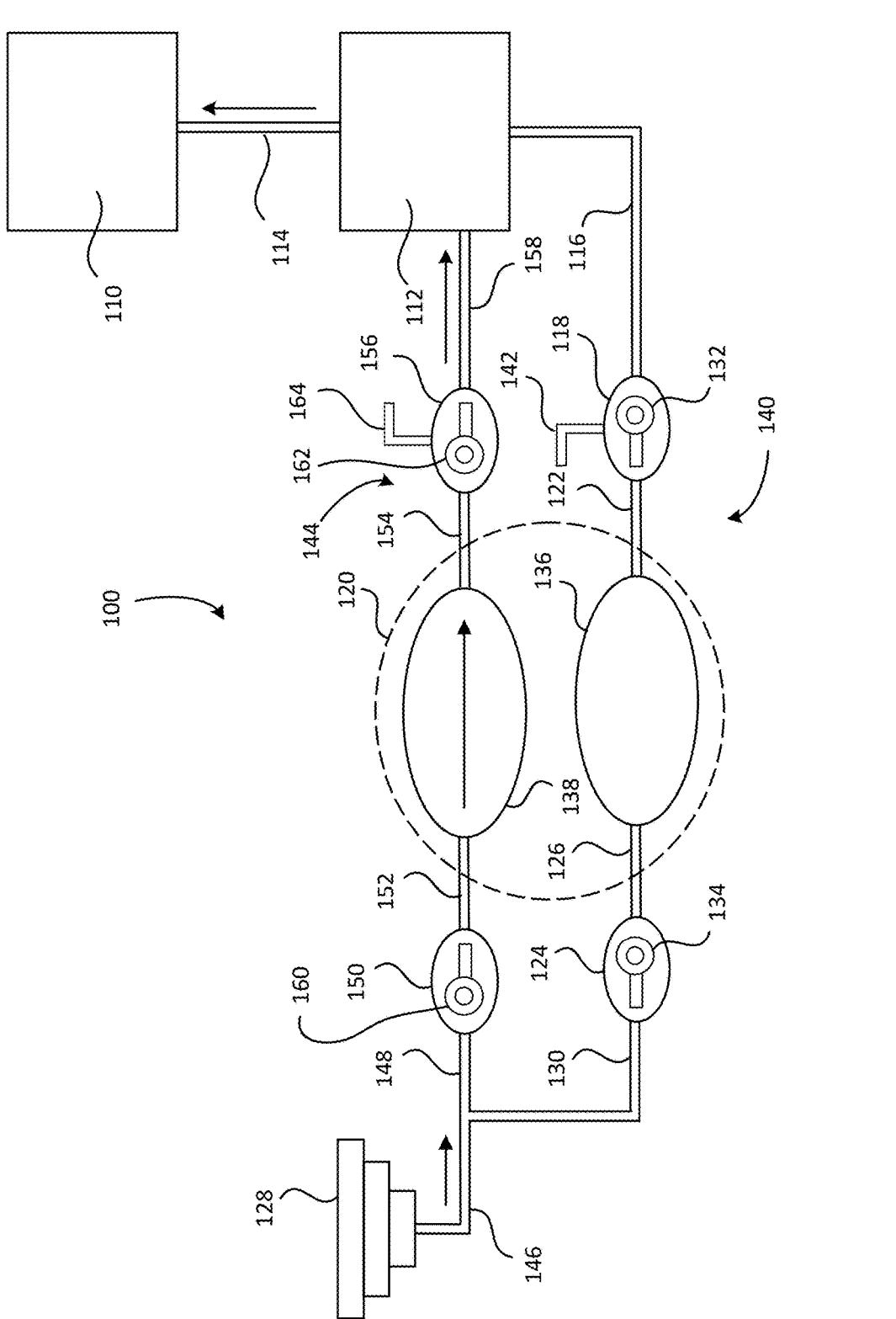
FIG. 6 is a diagrammatic representation of the configuration of FIG. 5 showing fluid flowing from the bowl to the bladder.
Figure 7:
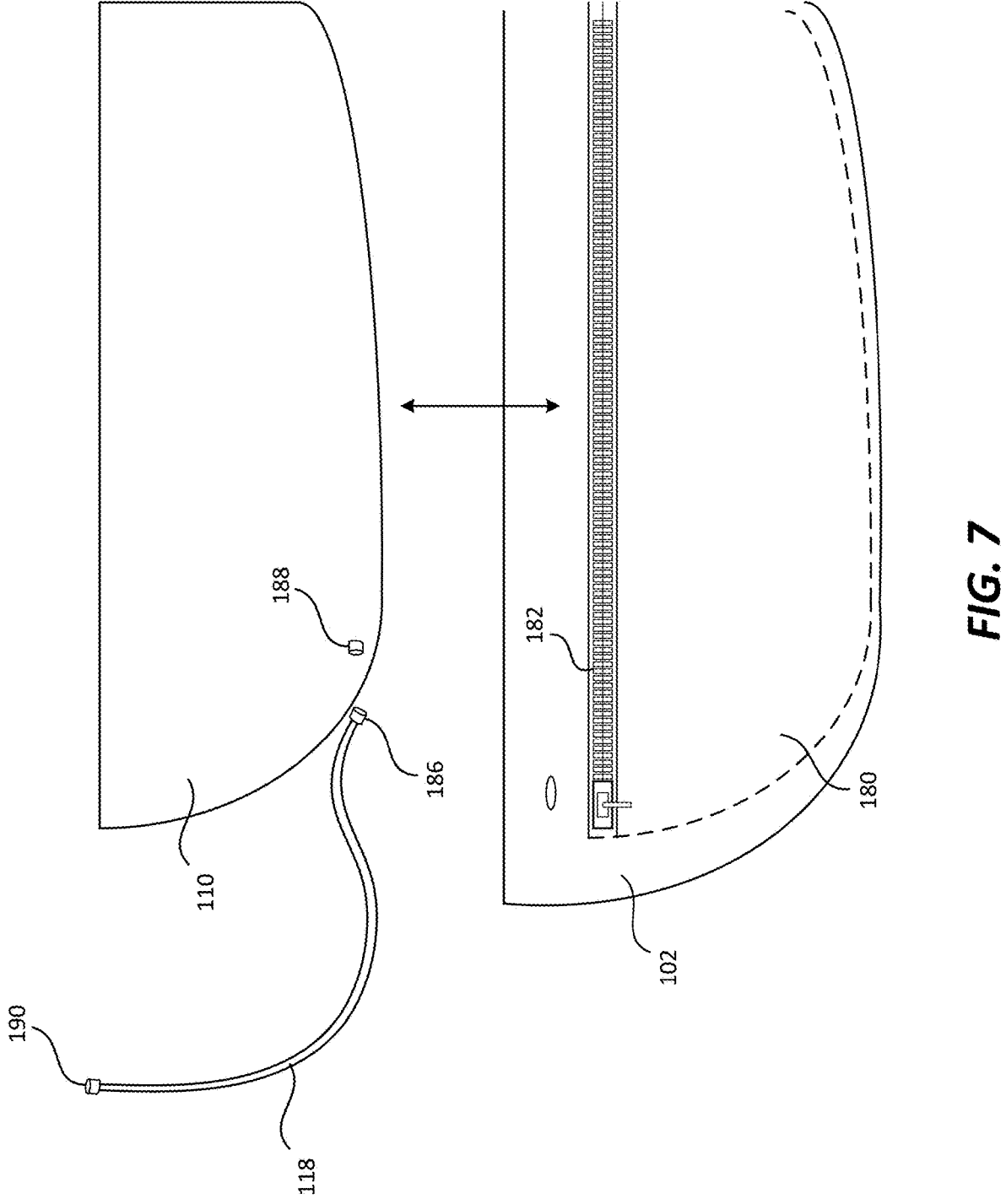
FIG. 7 is an illustration of the bladder bag removed from the zipper compartment with a detachable flexible tube according to FIG. 1.

In the configuration shown in FIG. 1, there are two compartments shown each having an opening mechanism 182, which in this configuration comprises a zipper and shown in more detail in connection with FIG. 7. Each of the compartments is adapted to receive a bladder bag that is capable of holding a liquid. A fluid pumping system 100, which will be discussed in more detail in connection with FIGS. 3-6 may be positioned within vest 102, for example, along the center portion 111 of the vest on the top of the animal's back. The various handles that can be adjusted and discussed below, may be fitted into vest 102 such that they are easily accessible from the exterior of the vest in area 111. Additionally, the various flexible tubing may extend within the interior of the vest 102, or may extend through various openings (e.g., opening 184).

Figure 8:
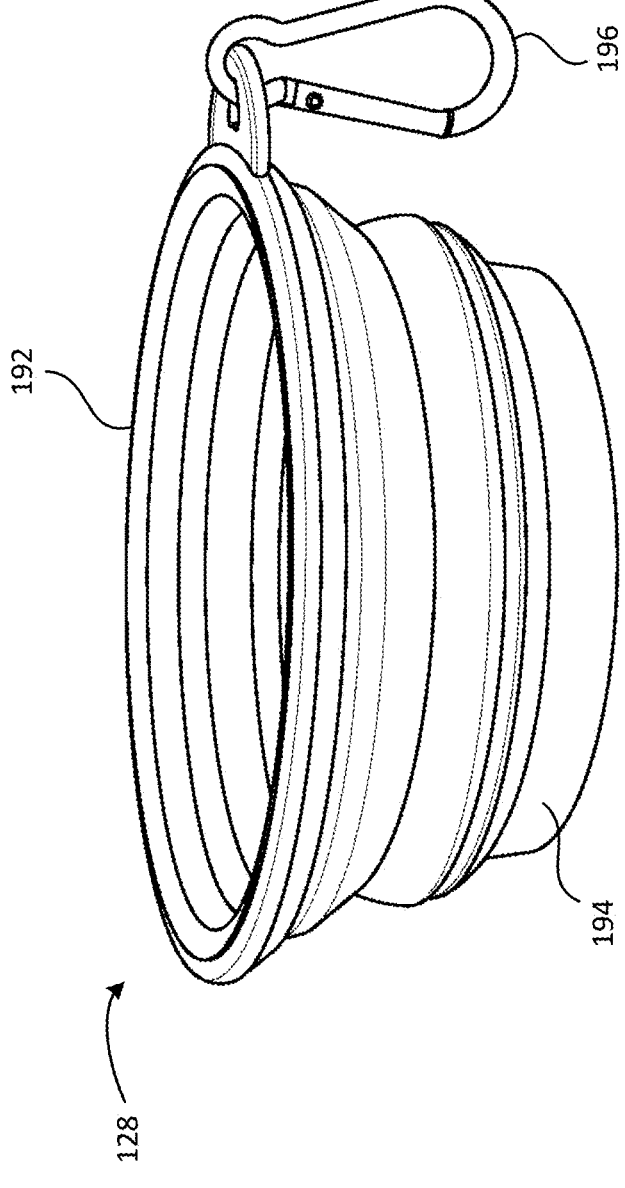
FIG. 8 is an illustration of a collapsible bowl in an expanded position according to FIG. 1.
Figure 9:
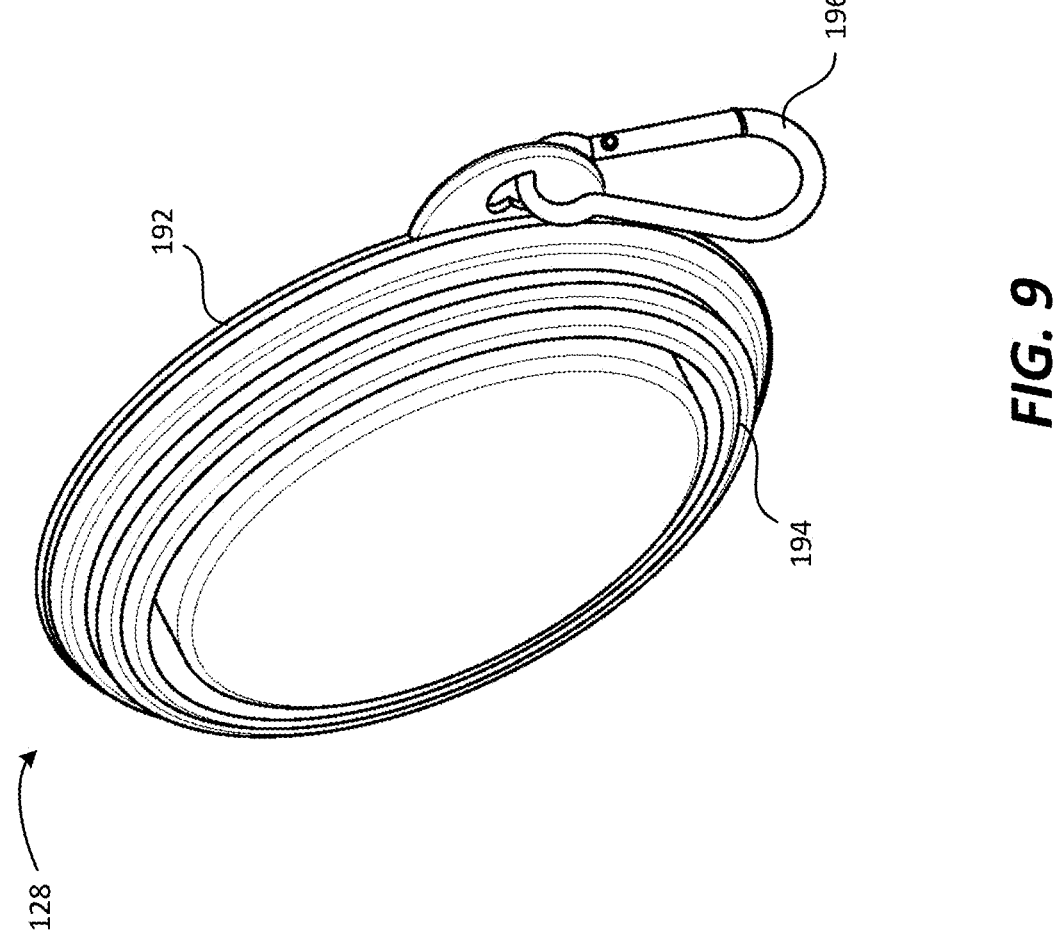
FIG. 9 is an illustration of a collapsible bowl in a collapsed position according to FIG. 1.

A water containment receptacle 128 having a flexible tube 130 connected to it, may be attachable to the vest 102. In one configuration, the water containment receptacle 128 is provided in the form of a bowl and may be positioned in a mesh compartment 113 provided on the exterior of vest 102 as shown for easy access and secure holding with not in use. In other configurations, the bowl may be attachable to the exterior of vest 102 via an attachment mechanism as illustrated in FIGS. 8 & 9.

Figure 3:
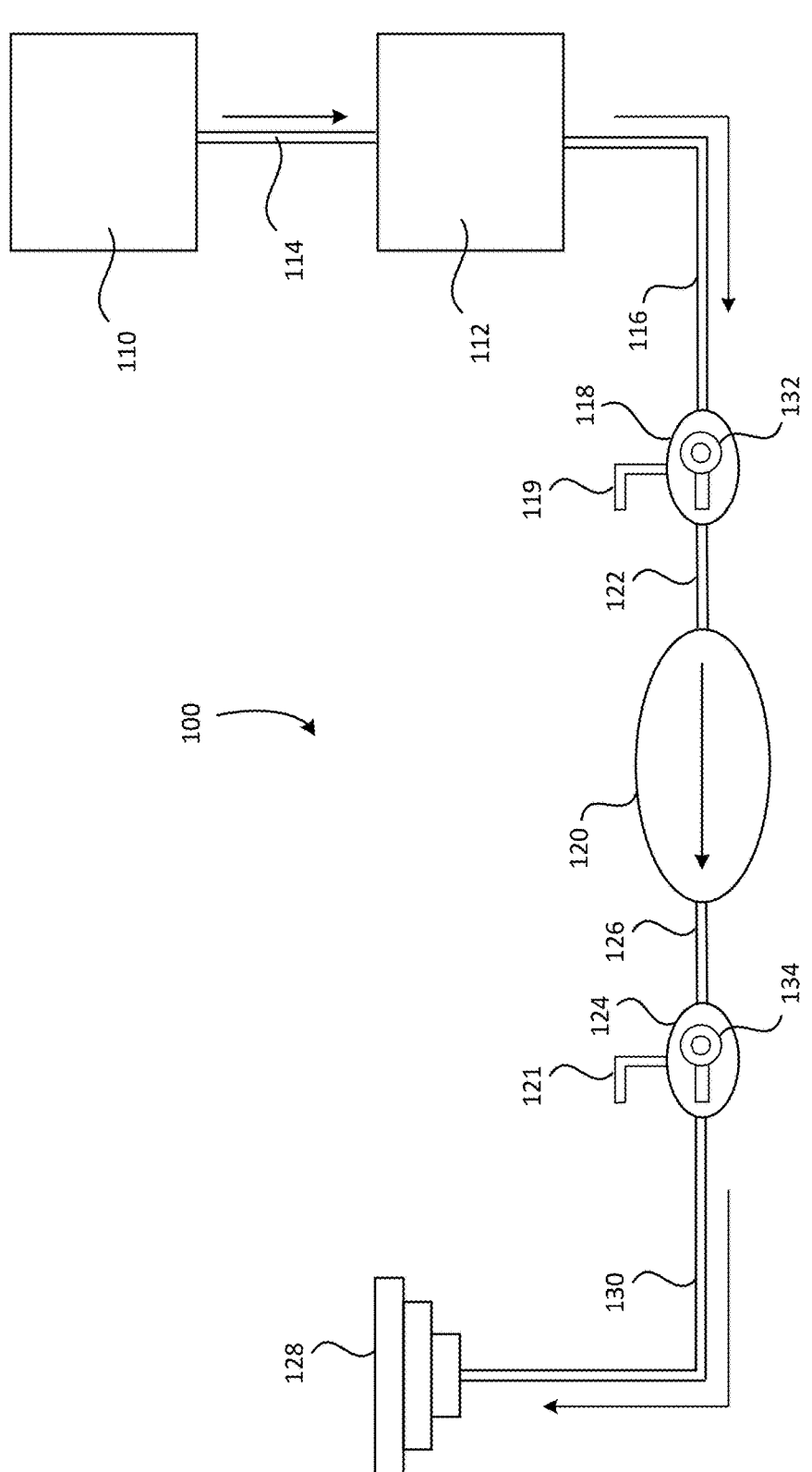
FIG. 3 is a diagrammatic representation of one configuration of the fluid pumping system according to FIG. 1 showing fluid flowing from the bladder to the bowl.
Figure 4:
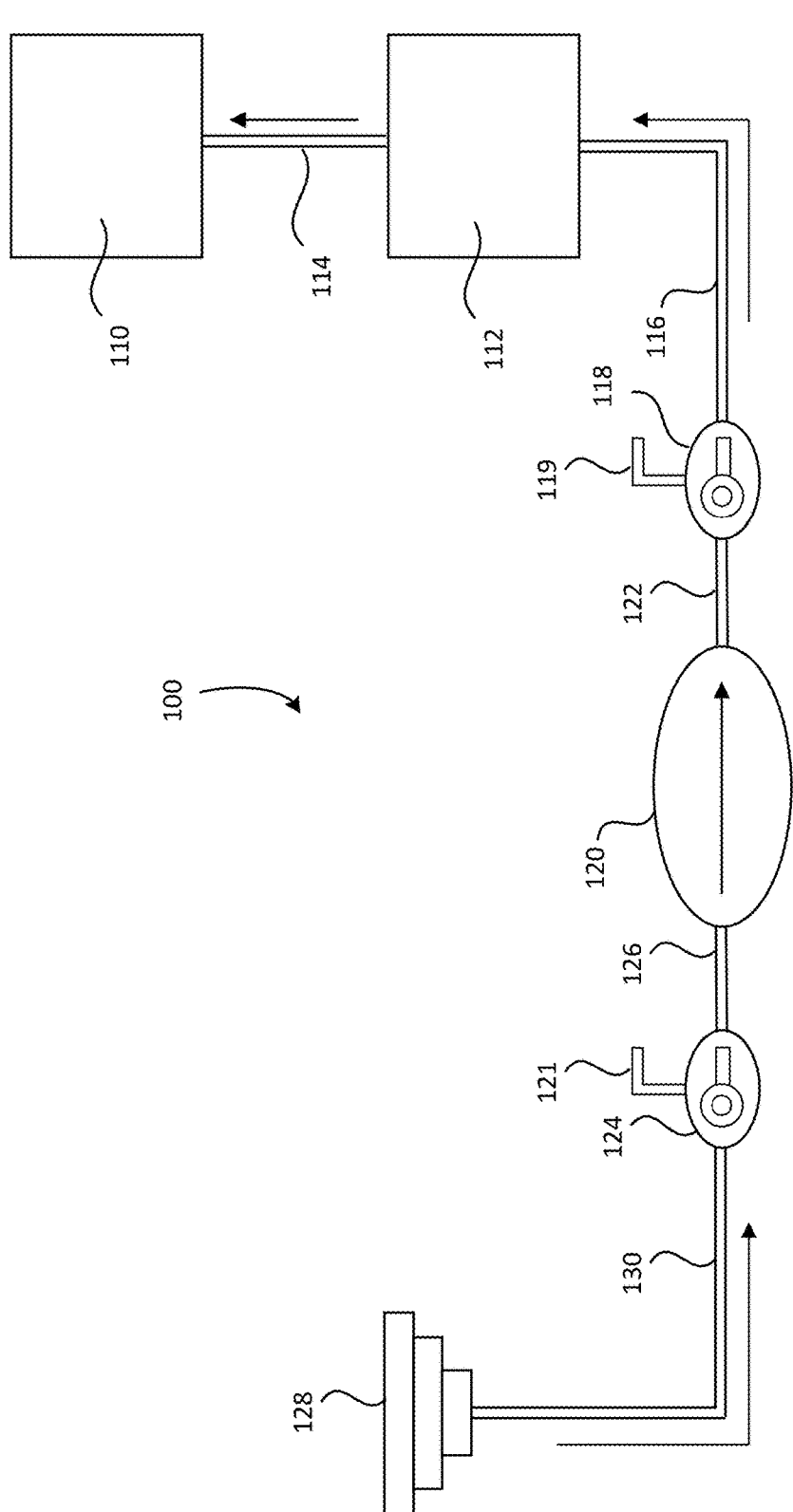
FIG. 4 is a diagrammatic representation of the configuration of FIG. 3 showing fluid flowing from the bowl to the bladder.

Referring to FIGS. 3 and 4, the fluid pumping system 100 comprises a first bladder bag (fluid container) 110 and a second bladder bag 112 connected by a flexible tubing 114. It is contemplated that the first and second bladder bags will generally sit on the sides and upper back of the animal while being transported. The bladder bags are in fluid communication with each other to act as one large fluid reservoir. A flexible tube 116 extends from the second bladder bag 112 to a first valve 118. A flexible tube extends from the first valve 118 to a pump 120 via a flexible tube 122. The pump 120 is connected to a second valve 124 via a flexible tube 126. The second valve 124 is in turn, connected to the water containment receptacle 128 via a flexible tube 130.

First valve 118 and second valve 124 are provided as ball valves. In addition to being constructed as ball valves, each of the valves is provided with an internal one-way valve 132, 134 in the first and second valves 118, 124 respectively. The one-way valves 132, 134 function to allow fluid to flow in one direction, but not flow backward in the opposite direction.

The fluid pumping system 100 functions as follows. The pump 120 is provided as a bulb pump that causes an internal displacement of any fluid in the internal space of the pump 120 when depressed and creates a negative pressure within the internal space of the pump 120 when it expands back to its resting shape. The pump comprises a biasing mechanism that biases the pump back toward its resting shape. This can be achieved by selecting a material that is sturdy and will readily resume its original shape when an external pressure collapsing it is removed. The selection of the material can provide a very resilient structure that will exert a relatively strong negative force to draw fluid into the pump when expanding to its resting shape. Alternatively, an internal biasing member could be used in conjunction with the resilient material that can exert an outward pressure on the inner walls of the pump 120.

When the valves 118, 124 are positioned in a first position as indicated in FIG. 3 and pump is actuated (collapsed), any fluid within the pump 120 will be displaced toward water containment receptacle 128 being prevented by the one-way valve 132 from traveling back into the first and a second bladder bags 110, 112. If no fluid is in the pump, then air is simply displaced. When the pump expands back to its original shape, this will function to create a negative pressure within the pump 120 where that negative pressure is transmitted to the first and a second bladder bags 110, 112. Fluid within the first and a second bladder bags 110, 112 is then drawn through the flexible tubes 114, 116, through the first valve 118 (through the one-way valve 132) and flexible tube 122 into the internal space of pump 120. When the pump is depressed again, the fluid that was drawn into the internal space of pump 120 is ejected outward. The only path for the fluid to take is through flexible tube 126 through valve 124 (through one-way valve 134), and through flexible tube 130 into water containment receptacle 128. This functions to deposit fluid (water) into the water containment receptacle 128, which may comprise in one configuration, a bowl for an animal to drink from.

When the animal has had enough water to drink, any excess in the water containment receptacle 128 does not need to be wasted but can be pumped back into the first and a second bladder bags 110, 112 as described in connection with FIG. 4.

Referring now to FIG. 4, when it is desired to pump water remaining in the water containment receptacle 128 back into the first and a second bladder bags 110, 112, the user must first change the positions of the first and second valves 118, 124 from the first position (shown in FIG. 3) to the second position (shown in FIG. 4) by changing the positions of handles 119, 121. This effectively reverses the one-way valves 132, 134 within each of the first and second valves 118, 124 respectively. Additionally, the handles 119, 121 for valves 118, 124 could be linked such that turning one automatically turns the other. For example, a single handle could be provided that could be switched between a "fill bowl" and "water return" setting.

At this point, the system functions similarly as described in connection with FIG. 3, however, the fluid is only allowed to travel toward the first and a second bladder bags 110, 112. In this way, any excess water left over in the bowl after the animal has finished drinking can be pumped back into the bladder bags with no spilling. Additionally, the system can function without vest 102 being removed from the animal reducing the amount of time needed to stop to allow the animal to drink.

Once the water has been returned to the first and second bladder bags 110, 112, the bowl can be stowed on the exterior of the vest 102 quickly and easily to allow immediate resumption of activities.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 5:
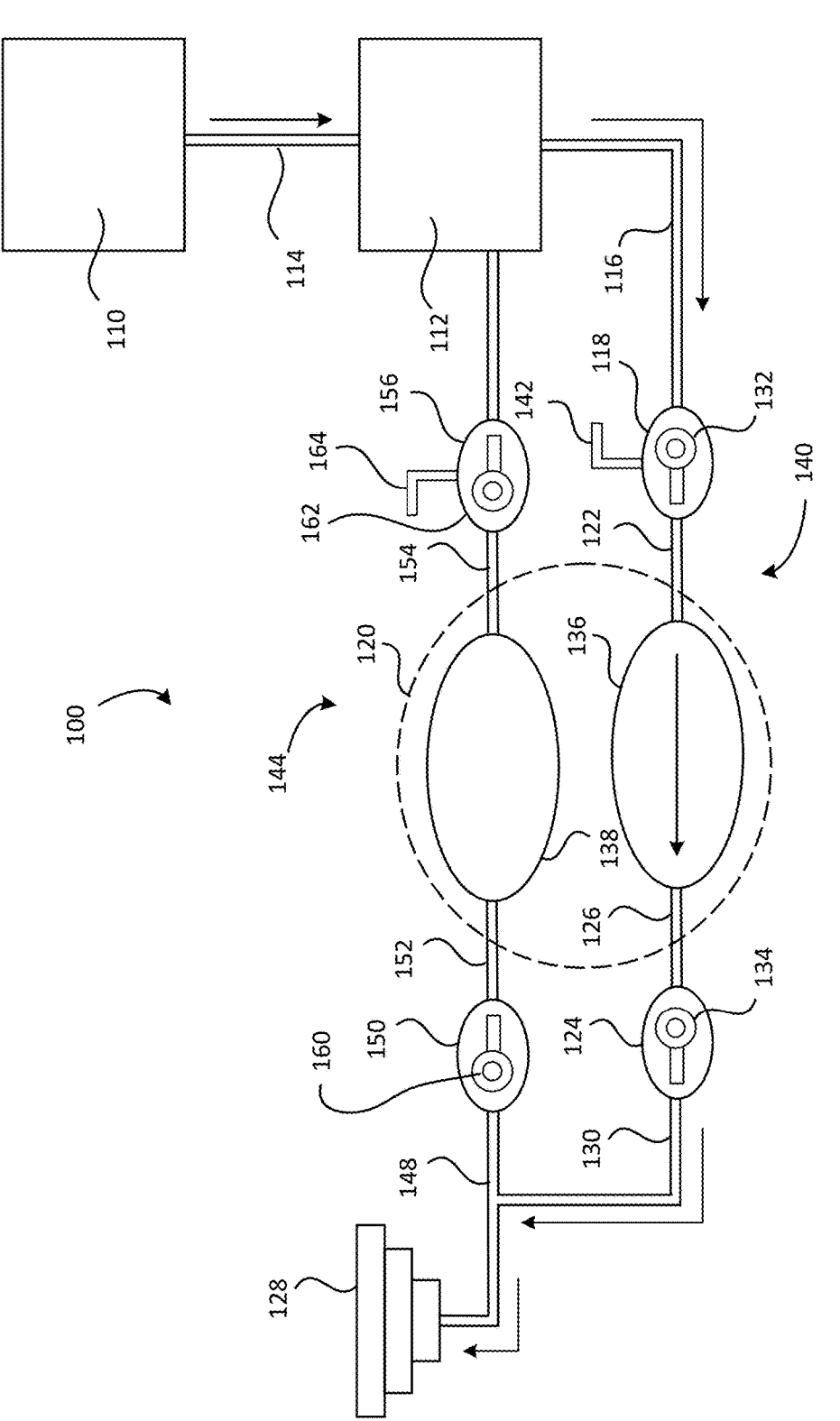
FIG. 5 is a diagrammatic representation of another configuration of the fluid pumping system according to FIG. 1 showing fluid flowing from the bladder to the bowl.

Referring now to FIGS. 5 and 6, another configuration for system 100 is depicted. In this configuration, the pump 120 is partitioned into a first pump section 136 and a second pump section 138. The first pump section 136 is associated with a first pumping line 140 that functions to allow fluid to be transferred from the first and second bladder bags 110, 112 to the water containment receptacle 128.

In this configuration, the one-way valves 132, 134 are not reversible. In other words, they only ever allow flow of fluid from the first and second bladder bags 110, 112 toward the water containment receptacle 128.

One difference in this configuration is that valve 118 comprises a shutoff handle 142 such that when the handle is turned from the first position (shown in FIG. 5) to the second position (shown in FIG. 6), fluid will be prevented from passing through the valve 118. Another difference is the T-connector that connects flexible tube 130 with flexible tube 146 that extends toward the water containment receptacle 128.

The configuration of FIG. 5 functions similar to the configuration described in connection with FIG. 3 where actuation of the pump 120, in particular, the first section 136, causes fluid to be transferred from the first and second bladder bags 110, 112 to the water containment receptacle 128.

Turning now to FIG. 6, a description of the second pumping line 144 is provided. A flexible tube 148 connects at one end to the T-connector that extends towards the water containment receptacle 128 and at another end to valve 150. A flexible tube 152 connects from the valve 150 to the second section 138 of pump 120, while a flexible tube 154 connects from the second section 138 of pump 120 to a valve 156. Finally, a flexible tube 158 connects between valve 156 and first bladder bag 112.

Valves 150, 156 are each provided with one-way valves 160, 162 that are provided internal to valves 150, 156 respectively. Additionally, a shutoff handle 164 that, when moved the position shown in FIG. 6 will allow fluid to pass through the valve 156.

In function, the system in FIG. 6 functions similarly to that shown in FIG. 4 namely fluid is transferred from the water containment receptacle 128 to the first and second bladder bags 110, 112.

While four valves 118, 124, 150, 156 are illustrated in FIGS. 5 and 6, it is contemplated that only two valves need to be used. For example, valves 124, 150 could be eliminated such that only valves 118, 156 are used. The system would function similarly to that previously described in connection with FIGS. 5 and 6. Additionally, a T-connection could be used to join flexible tubes 116, 158 into a common tube prior to connecting to the first and second bladder bags 110, 112. Still further, the shutoff handles 142, 164 for valves 118, 156 could be linked such that turning one automatically turns the other. For example, a single handle could be provided that could be switched between a "fill bowl" and "water return" setting.

Referring now to FIG. 7, the detachable nature of the bladder bag 110 is illustrated. For example, bladder bag 110 is illustrated as removed from pocket 180 that is in the side of vest 102. Pocket 180 is illustrated by the dashed line indicating the internal size of pocket 180. Pocket 180 may be accessible via an opening mechanism 182, which in this illustration comprises a zipper. However, it is contemplated that virtually any type of opening mechanism could be used, including, for example, hook and loop fasteners, buttons, or any suitable mechanism.

Also shown on the side of vest 102 is an opening 184, that is provided to allow for flexible tube 118 to pass through. It is contemplated that flexible tube 118 may be detachable from bladder bag 110 via a connector 186, 188 that could comprise any type of suitable connector allowing for a secure connection. It is contemplated that a connector 190 can be provided at the other end of flexible tube 118 allowing the conduit to be removed and cleaned or replaced as needed. Additionally, it is contemplated that any of the flexible tubes described herein can be detachable for east of cleaning and/or replacement including the flexible tubes extending between the bladder bags 110, 112.

Referring now to FIGS. 8 and 9, the water containment receptacle 128 is illustrated. The water containment receptacle 128 is provided in the form of a collapsible bowl where FIG. 8 shows the bowl expanded and FIG. 9 shows the bowl collapsed. The bowl may comprise a lightweight plastic material having an upper lip 192 and an expandable body portion 194. The upper lip 192 may further be provided with a connecting mechanism 196 that facilitates the bowl to be fastened to the vest 102 but allowing for quick and easy removal for use. In the example shown, the mechanism comprises a clip, however, it is contemplated that many different types of mechanisms could effectively be utilized to secure the water containment receptacle 128 to the vest. For example, a mesh pocket could be formed on the exterior of vest 102 to hold the water containment receptacle 128 and a portion of the flexible tubing 130.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A fluid pumping system adapted to be worn by an animal via a harness, the system comprising:
   a bladder bag supported by the harness and adapted to be filled with a fluid;
   a valving system supported by the harness and including:
      a first reversable one-way valve;
      a pump;
      a second reversable one-way valve;
   a first flexible tubing connected at one end to the bladder bag and at another end to a first end of said valving system;
   a second flexible tubing connected at one end to a second end of said valving system and at another end to a bowl affixed to the second flexible tubing;
   wherein when said pump is actuated, fluid flows from the bladder bag through said valving system and to said fluid dispensing receptacle.

2. The system according to claim 1, wherein the first one-way valve and the second one-way valve are each selectable to a first position and a second position, wherein when the first and second one-way valves are in the first position, actuation of the pump will cause fluid to be transferred from the bladder bag to the bowl,
   wherein when the first and second one-way valves are in the second position, actuation of the pump will cause fluid to be transferred from the bowl to the bladder bag.

3. The system according to claim 2, wherein the first one-way valve and the second one-way valve each comprise a handle that is rotatable between the first position and the second position.

4. The system according to claim 3, wherein the first one-way valve and the second one-way valve each comprise a ball valve with a one-way valve positioned within each ball valve.

5. The system according to claim 1, wherein
   said valving system further comprises:
      a third one-way valve;
      a fourth one-way valve;
   said pump is partitioned into a first section and a second section, wherein the first section is coupled to said first and second one-way valves and the second section is coupled to said third and fourth one-way valves;
   wherein when the first section of the pump is actuated, fluid flows from the bladder bag through said valving system and to said bowl; and
   wherein when the second section of the pump is actuated, fluid flows from the bowl through said valving system and to said bladder bag.

6. The system according to claim 1, wherein the harness comprises a detachable vest comprising at least one pocket for holding the bladder bag.

7. The system according to claim 6, wherein the vest comprises neoprene.

8. The system according to claim 6, wherein the bladder bag is detachably insertable into the pocket.

9. The system according to claim 6, wherein the pocket has an opening provided therein allowing the first flexible tubing to pass therethrough.

10. The system according to claim 1, wherein the bowl is collapsible.

11. The system according to claim 1, wherein the bowl comprises silicon.

12. The system according to claim 1, wherein the bowl is attachable to an underside of the harness.

13. The system according to claim 1, wherein the pump comprises a manually actuated bulb pump.

14. The system according to claim 13, wherein the pump comprises a biasing mechanism such that when the pump is collapsed, the biasing mechanism functions to return the bulb pump to its original shape prior to being collapsed such that a negative pressure is created inside the bulb pump to draw fluid into the bulb pump.

15. The system according to claim 14, wherein the biasing mechanism is caused by the material forming the pump such that when the pump is collapsed, the pump will act to return to its original shape.

16. A method of transferring a fluid in a fluid transfer system maintained in a harness attached to an animal and supporting a bladder bag filled with the fluid comprising the steps of:
   detaching a bowl from the harness, the fluid dispensing receptacle connected to a valving system via a second flexible tubing;
   switching a first one-way valve associated with the valving system to a first position;
   switching a second one-way valve associated with the valving system to a first position;

actuating a pump to cause fluid to transfer from the bladder bag through a first flexible tubing and through the first and second one-way valves via and into the bowl;

switching the first one-way valve to a second position;

switching the second one-way valve to a second position; and actuating the pump to cause fluid to transfer from the bowl into the bladder bag.

17. A method of transferring a fluid in a fluid transfer system maintained in a harness attached to an animal and supporting a bladder bag filled with the fluid comprising the steps of:

detaching a bowl from the harness, the bowl connected to a valving system via a second flexible tubing;

actuating a first section of a pump to cause fluid to transfer from the bladder bag through a first flexible tubing, through a first and second one-way valve, through the second flexible tubing, and into the bowl; and actuating a second section of the pump to cause fluid to transfer from the bowl through a fourth flexible tubing, through a third and fourth one-way valve, through a third flexible tubing, and into the bladder bag.

18. The method according to claim 17, wherein the pump comprises a manually actuated bulb pump and the first section is internally portioned from the second section.

* * * * *